Dec. 23, 1941.  J. E. REILLEY  2,267,254
SPHERICAL VEHICLE
Filed Jan. 30, 1940   4 Sheets—Sheet 1

INVENTOR
John E. Reilley
BY
Smith & Tuck
ATTORNEYS

Dec. 23, 1941.    J. E. REILLEY    2,267,254
SPHERICAL VEHICLE
Filed Jan. 30, 1940    4 Sheets-Sheet 2

INVENTOR
John E. Reilley
BY
Smith Tuck
ATTORNEYS

Dec. 23, 1941.  J. E. REILLEY  2,267,254
SPHERICAL VEHICLE
Filed Jan. 30, 1940   4 Sheets-Sheet 3

INVENTOR
John E. Reilley
BY
Smith & Tuck
ATTORNEYS

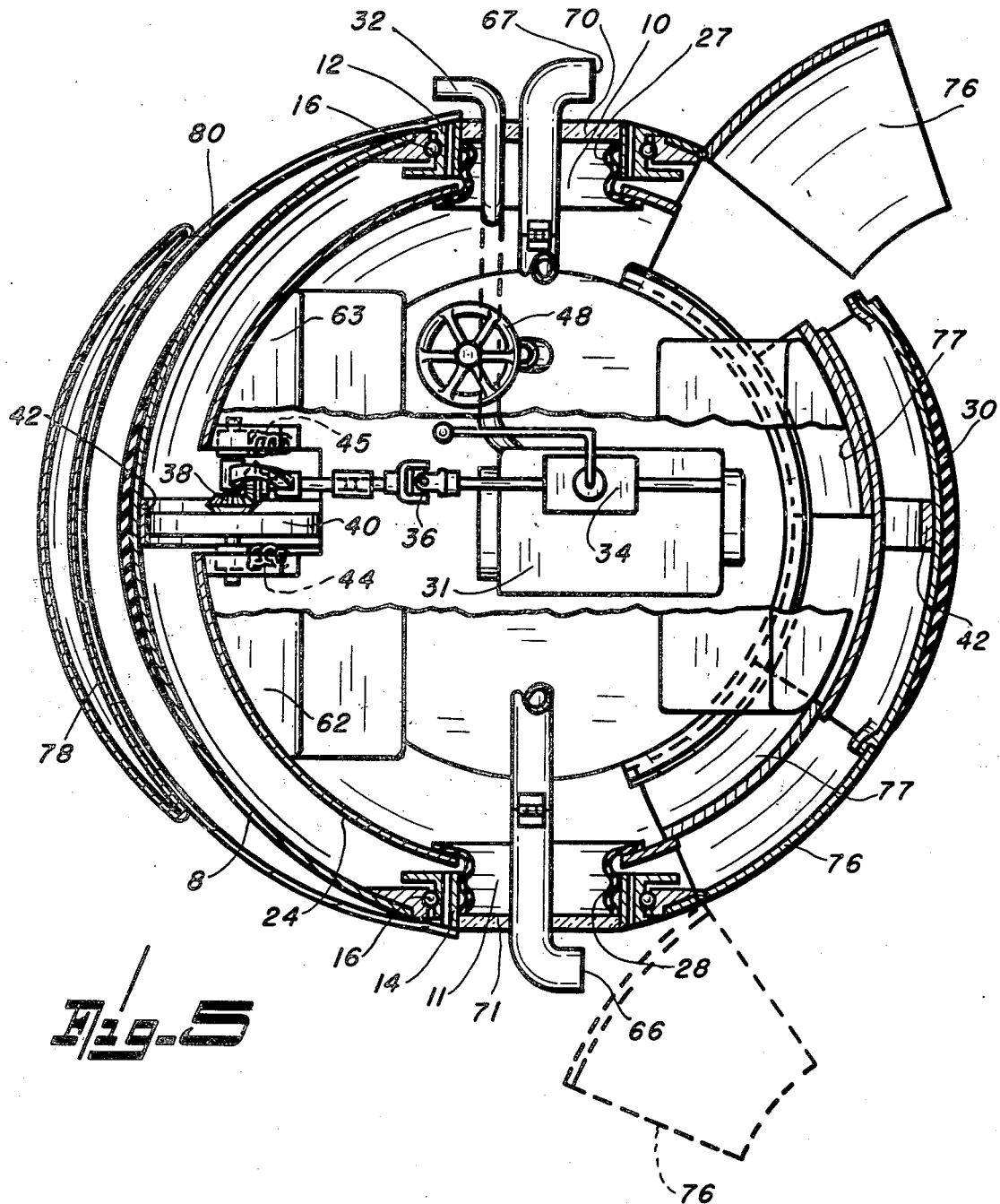

Patented Dec. 23, 1941

2,267,254

UNITED STATES PATENT OFFICE 2,267,254

SPHERICAL VEHICLE

John E. Reilley, Seattle, Wash.

Application January 30, 1940, Serial No. 316,453

4 Claims. (Cl. 180—21)

My present invention relates to the art of land and water vehicles, and more particularly to a spherical vehicle.

My invention consists essentially of a spherical, ball-like vehicle adapted to progress by rolling on its circumference normal to its horizontal axis. Suspended on the horizontal axis is an inner platform, or car, mounted on anti-friction bearings which, in turn, are mounted in the revolving ball. With this arrangement it will be apparent, it is believed, that the passenger and motor carrying portion of the ball remain substantially level at all times, being disposed with its mass below the horizontal axis. Motive power of a somewhat conventional, internal combustion engine is transmitted to the outer shell, or ball, by a drivewheel, which engages a raceway secured to the inner surface of the ball and in a plane at right angles to the horizontal axis. Reflecting means, embodying the principles of periscopes, are used for vision out along the horizontal axis, although this may possibly be dispensed with in the future when transparent plastics are available for such structures.

A vehicle made after the teachings of my invention should be equally well adapted to water and land; and it should be able to negotiate most unusual ground such as brush, rough, or particularly, swampy areas. While it might, of necessity, be forced to travel at reduced speeds, it would have much less dependency on roads than vehicles of conventional structure. Such a vehicle should be of great value in warfare, as the ball-like, outer surface should provide for the maximum deflection of bullets, small projectiles, and the like. At the same time, the vehicle itself could roll across trench systems, barb wire, and through many areas now insuperable by tanks and the like.

The principal object of my present invention is to provide a vehicle insuring, to the occupants and to others encountered, greater safety, due to its spherical shape, than is possible with present day vehicles. When my sphere collides with another vehicle, pedestrian, or object, there would be a decided tendency of its being deflected instead of being forced to the abrupt, sharp, stop which would usually occur with a conventional motor car.

A further object and advantage of my present device consists in providing a spherical vehicle with a very low center of gravity, which prevents the over-turning experienced by conventional automobiles and the like, thus eliminating the cause of a high percentage of the present fatalities.

A further object of my present invention is to provide a vehicle which can travel on land, through snow, or on the water, as the low center of gravity and the fact that the sphere revolves makes traction, with safety, possible in all such cases.

A further object of my present invention is the provision of periscopic means for vision which, due to its spherical structure, can be made so as to give vision at any point around the entire sphere, thus insuring greater safety.

Another object of my invention is to take advantage of the unusual, streamline effects obtained from a revolving ball, which make it possible to obtain extremely high speeds without excessive power.

Other and more specific objects will be apparent from the following description taken in connection with the accompanying drawings, wherein Figure 1 is a perspective view of my spherical vehicle as viewed from the front quarter.

Figure 5 is a sectional view, taken along a horizontal plane extending through the axis of rotation, with certain parts broken away to better illustrate the construction, particularly the drive and supporting means.

Figure 1:
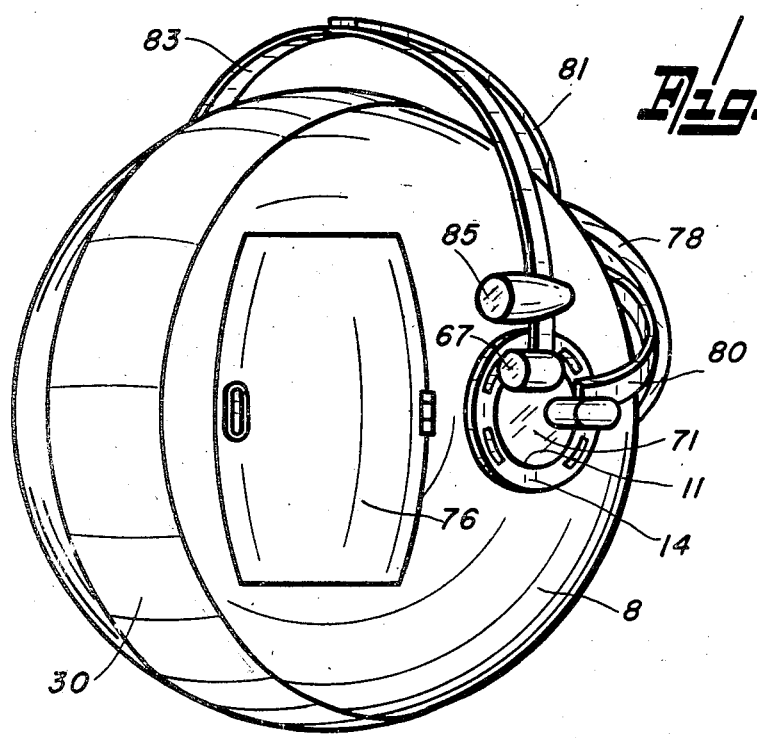
Figure 2:
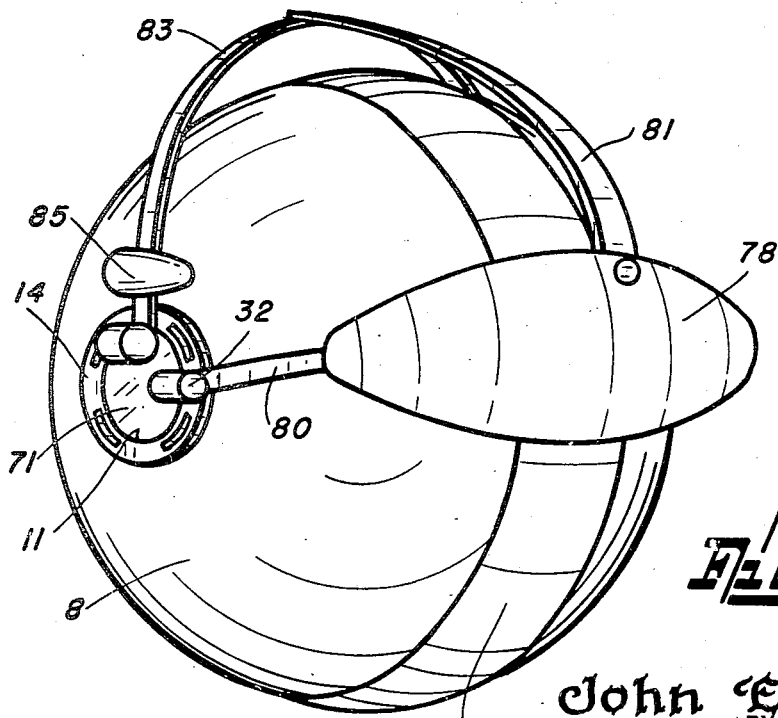
Figure 2 is a perspective view of the same as viewed from a rear quarter.

Referring to the drawings, throughout which like reference characters indicate like parts, 8 designates the outer shell of my device. This I prefer to give a spherical form, except where it is pierced by the openings 10 and 11 which normally are fitted with shatter proof glass. This outer shell may be made of any suitable material. At present, light weight metals appear to be the most satisfactory. However, with the rapid improvement in plastics, and in the manufacture of flexible glass, it is possible that these materials may be adaptable to this shell structure. This would be highly desirable in that it would give greater vision and an abundance of light in the interior of my vehicle.

Suspended in openings 10 and 11 are trunnion members 12 and 14. These members are positioned by the antifriction bearings indicated at 16 so that the outer sphere is free to revolve and merely supports, in so doing, trunnions 12 and 14. These trunnions have secured to them a number of band-like supporting members as 18, 19, 20, and 21. These members are so disposed as to carry the entire load of the machinery and passenger carriage parts of my vehicle. This interior car I also prefer to give a largely spherical form as illustrated in the figures by the sphere 24, which is supported from members 18, 19, 20, and 21 by the leaf springs illustrated at 26. Thus the inner sphere is amply spring-supported from the outer shell and is, therefore, relieved from road shock and the like, in the same manner the present automobile is supported. Connection is made between the inner and outer spherical members by means of the flexible collar or tubing members 27 and 28. Following out the same general principles involved in automobile structures, I provide on the outside of sphere 8 a resilient pad, or tire, 30. Throughout the drawings I have illustrated this as merely a solid rubber cushion, although it is conceivable that a pneumatic structure might be so employed.

Mounted, so as to be supported by trunnions 12 and 14 and secured to the inner sphere 24, is a prime mover 31 designed with a low center of gravity, and usually of the opposed-cylinder type. This motor is otherwise conventional and exhausts out along the horizontal axis through the exhaust pipe 32. Any suitable air intake may be provided for taking air into the inner sphere. Motor 31 drives through a conventional change speed transmission 34 and out through a universal coupling 36 to a bevel gear arrangement illustrated at 38. This gear arrangement drives the driving wheel 40. The driving wheel, in turn, contacts a race way 42 which extends entirely around the inner periphery of the outer sphere. Sufficient frictional contact can be assured by the pressure springs illustrated at 44 and 45.

In order to insure positive movement of the outer sphere, the inner sphere and its associated drive means and passenger compartment must have a low center of gravity. To this end I have provided a shifting weight as 46 which may be shifted transversely of the sphere or along the axis of rotation of the sphere. In this manner, not only does weight 46 assist in providing a low center of gravity, but by shifting it transversely, as through the steering wheel 48, the ball is partially revolved in the direction the weight is moved. This tipping provides steerage comparable to leaning on a bicycle in making a turn.

Figure 3:
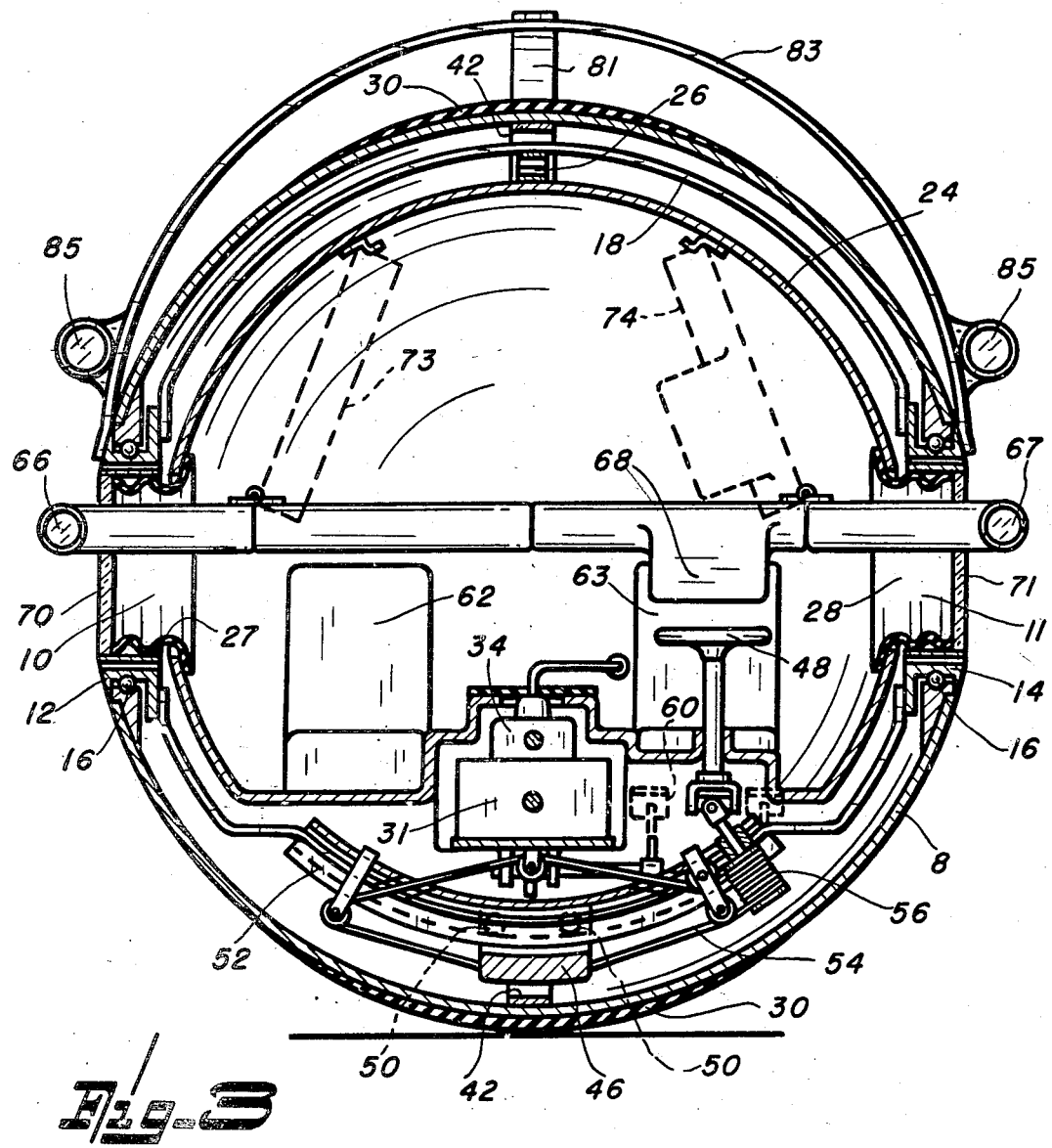
Figure 3 is a vertical, sectional view taken along the axis of rotation of my ball showing the periscopic means in outline.
Figure 4:
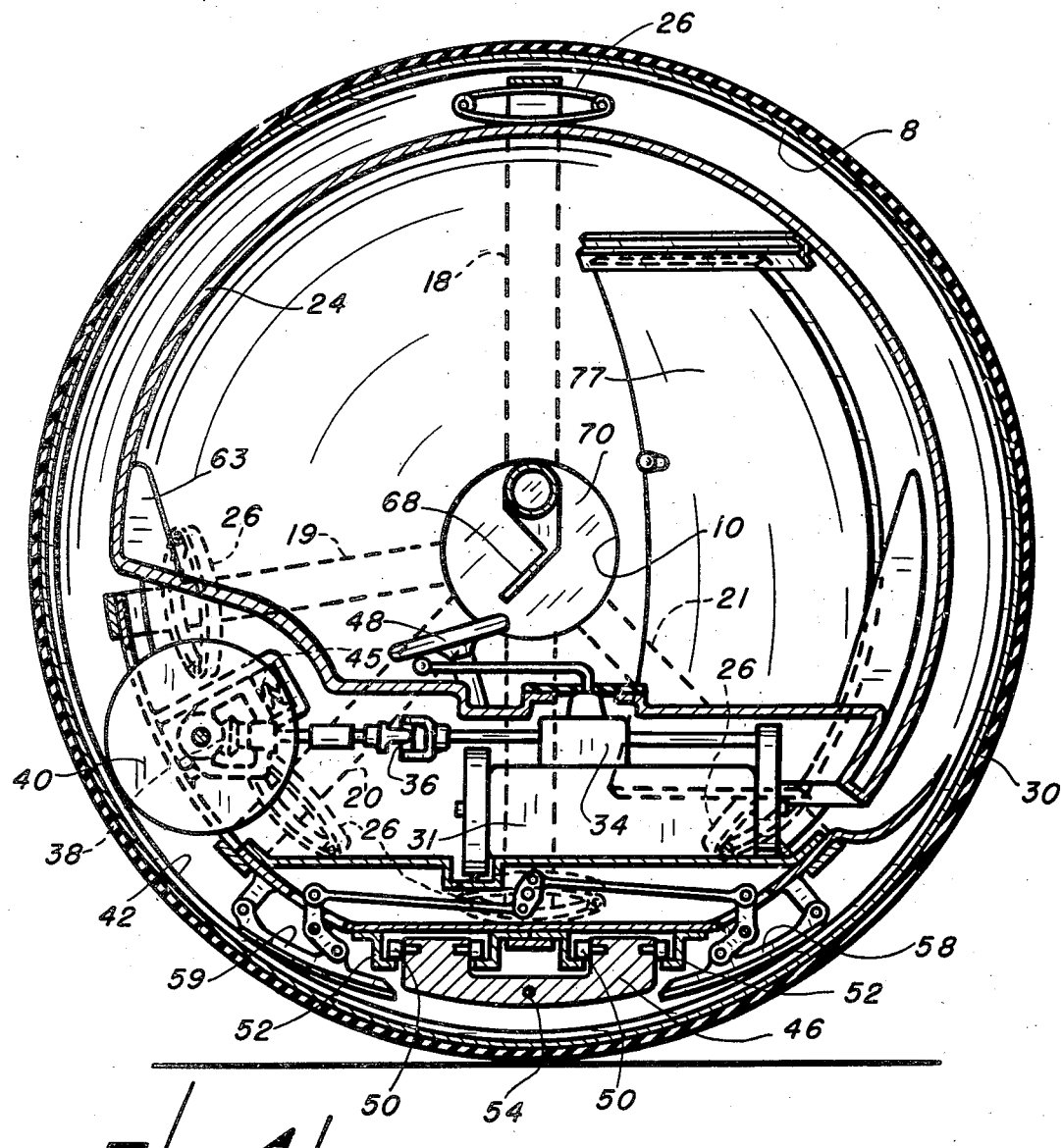
Figure 4 is a sectional view taken at right angles to the view of Figure 3.

A thorough understanding of this steering arrangement can be had by a study of Figures 3 and 4. Weight 46 is carried on a plurality of rollers 50 which operate in guide ways as 52. Then, with the cable arrangement shown at 54, particularly in Figure 3, the steering wheel 48, having a winding drum 56 may, by moving the endless cable, change the transverse position of weight 46.

In order to stop the vehicle, or to hold the same on an incline, I have provided the brake shoes illustrated at 58 and 59. These brake shoes are connected by suitable linkage to a foot brake pedal 60. The brake shoes are so positioned as to engage race way 42, which extends entirely around the inside of the outer sphere and is suitably machined for frictional engagement.

Any convenient manner of seating the passengers can be arranged for. In my present showing I have indicated the two seats with the usual backs at 62 and 63. The exact seating arrangement would be dependent on the size of the sphere, the type of motor power employed, and many other considerations. When my vehicle is made of opaque materials, particularly metal, the vision can only be obtained through some periscopic means, and to this end I have illustrated such an arrangement passing out through the axis of rotation of the ball. I have provided the objective lenses as 66 and 67, which can be made to focus on a screen as at 68, so that the driver of the vehicle will have full vision of the area covered by the objective lenses. In this instance it is intended that the objective lenses themselves should be made adjustable by any of the various means well known in the manufacture of such devices. Vision can also be assisted by the glass windows indicated at 70 and 71, but it is believed that ultimately a transparent material of satisfactory character can be obtained which will make it possible to see through both the inner shell 24, and the outer shell 8 so that greatly increased vision will be possible. Until such time as suitable material is available, however, I have found it very desirable to have a complete inner sphere so that the passengers will not be confused or annoyed by the movement of the outer shell.

In order that the passenger, in the form I have illustrated, may have ingress and egress to the car, I have provided that the periscopic member be made of sections which may be hinged up out of the way as indicated at 73 and 74. Entrance to the car itself must, of necessity, be through a door in the outer shell or sphere. This has been provided at 76, shown in Figure 1. Entrance to the inner ball is made through the slidding doors 77.

It is also necessary to provide for a gasoline supply. This might be carried inside the car. It is preferable, however, on the outside, and the same has therefore been illustrated at 78 wherein it is supported from the non-rotating axis of rotation by the hoop-like members 80, 81, and 83. These members can also be used as a mount base for running lights such as the head lights indicated at 85 and any other lights that might be found desirable. It will follow, it is believed, that the gasoline service line leading from tank 87 could easily follow member 80 and be led into the interior of the car directly to the motor requiring the fuel.

The foregoing description and the accompanying drawings are believed to clearly disclose a preferred embodiment of my invention, but it will be understood that this disclosure is merely illustrative and that such changes in the invention may be made as are fairly within the scope and spirit of the following claims.

I claim:

1. In a motor vehicle, the combination with a shell having an annular exterior tread and an annular concentric inner track, a self-leveling housing spaced within the shell, and axially alined horizontal bearings between said shell and housing, driving-means co-acting with said track and mounted below the exterior of the housing, a supporting frame rigid with the housing and arcuate guides rigid with and located beneath the frame, a laterally movable weight mounted in said guides, and steering mechanism for shifting said weight to tilt the vehicle laterally on its tread.

2. In a motor-vehicle, the combination with a shell having an exterior annular tread and horizontal axially alined bearing rings, of a supporting frame spaced within the shell and having concentric bearing rings, an inner housing supported by the frame, motor-operated driving mechanism mounted on the frame for co-action with a driven-member of the shell, steering means mounted on and located beneath the frame for laterally tilting the vehicle on its tread, means for operating said steering means, and braking mechanism mounted on the frame for co-action with said driven-member.

3. In a motor vehicle, the combination with a spherical exterior shell having an exterior annular tread and a concentric inner track, and horizontally alined bearing rings, of a self-leveling frame within the shell having complementary bearing rings, an inner housing having axially alined flexible collars mounted in the frame bearing rings, motor-operated driving mechanism mounted in the frame below the axial center of the vehicle, and said driving mechanism including a friction drive wheel in contact with said track.

4. In a motor-vehicle, the combination with a spherical shell having an exterior annular tread and horizontally alined bearing rings, of a self-leveling frame within the shell having complementary bearing rings, a housing, mounted within the frame and resilient cushions between said housing and the frame, axially alined flexible collars mounted between the housing and the frame bearing rings, transparent windows mounted in the bearing rings of the frame, motor-operated means for revolving the shell, and means within the shell for steering the vehicle.

JOHN E. REILLEY.